(12) United States Patent
Jain et al.

(10) Patent No.: US 9,432,150 B2
(45) Date of Patent: Aug. 30, 2016

(54) APPARATUS AND METHOD TO EFFICIENTLY SEND DEVICE TRIGGER MESSAGES

(71) Applicant: Intel Corporation, Santa Clara, CA (US)

(72) Inventors: Puneet Jain, Hillsboro, OR (US);
Varun Rao, Cincinnati, OH (US);
Chang Hong Shan, Shanghai (CN);
Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/665,160

(22) Filed: Mar. 23, 2015

(65) Prior Publication Data

US 2015/0249958 A1 Sep. 3, 2015

Related U.S. Application Data

(63) Continuation of application No. 13/755,166, filed on Jan. 31, 2013, now Pat. No. 8,989,070.

(60) Provisional application No. 61/667,325, filed on Jul. 2, 2012.

(51) Int. Cl.
*H04W 52/02* (2009.01)
*H04L 1/18* (2006.01)
(Continued)

(52) U.S. Cl.
CPC ........... *H04L 1/1861* (2013.01); *H04L 1/0025* (2013.01); *H04L 1/1628* (2013.01);
(Continued)

(58) Field of Classification Search
CPC ............................................. H04W 52/0209
See application file for complete search history.

(56) References Cited

U.S. PATENT DOCUMENTS 8,989,070 B2  3/2015  Jain et al.
2004/0252662 A1  12/2004  Cho
(Continued)

FOREIGN PATENT DOCUMENTS

CN   103763694 A   4/2014
ES     2447340 A2   3/2014
(Continued)

OTHER PUBLICATIONS

"3rd Generation Partnership Project; Technical Specification Group Services and System Aspects; Architecture Enhancements to facilitate communications with Packet Data Networks and Applications", 3gpp Draft; 23682-010-CI, 3rd Generationpartnership Project (3GPP), Mobile Competence Centre ; 650, Route Des Lucioles ; F-06921 Sophia-Antipolis Cedex ; France, (Dec, 2, 2011).
(Continued)

*Primary Examiner* — John Blanton
(74) *Attorney, Agent, or Firm* — Schwegman Lundberg & Woessner, P.A.

(57) ABSTRACT

With the proliferation of Machine-Type Communication (MTC), an excessive use of device trigger messages in a Long Term Evolution (LTE) network can have negative effects on user equipment (UE). These effect can include a shortening of UE battery life and/or excessive signalling caused by the frequent changing from an idle mode to an active mode. An MTC Interworking Function (MTC-IWF) can be configured to determine the status of a UE to which a device trigger message is intended. If the device trigger message is low priority and the UE is in an idle state, the MTC-IWF or Mobile Management Entity (MME)/Serving GPRS Support Node (SGSN)/Mobile Switching Center (MSC) can buffer the device trigger message.

14 Claims, 7 Drawing Sheets

(51) Int. Cl.

| | | |
|---|---|---|
| H04W 28/08 | (2009.01) | |
| H04W 24/10 | (2009.01) | |
| H04W 72/04 | (2009.01) | |
| H04W 72/00 | (2009.01) | |
| H04W 92/02 | (2009.01) | |
| H04L 5/00 | (2006.01) | |
| H04W 4/00 | (2009.01) | |
| H04W 36/22 | (2009.01) | |
| H04L 5/14 | (2006.01) | |
| H04W 48/12 | (2009.01) | |
| H04W 68/00 | (2009.01) | |
| H04L 1/00 | (2006.01) | |
| H04L 1/16 | (2006.01) | |
| H04W 88/08 | (2009.01) | |

(52) U.S. Cl.
CPC ........... *H04L1/1812* (2013.01); *H04L 1/1854* (2013.01); *H04L 1/1887* (2013.01); *H04L 5/0048* (2013.01); *H04L 5/0053* (2013.01); *H04L 5/0055* (2013.01); *H04L 5/0073* (2013.01); *H04L 5/14* (2013.01); *H04W 4/005* (2013.01); *H04W 24/10* (2013.01); *H04W 28/08* (2013.01); *H04W 36/22* (2013.01); *H04W 48/12* (2013.01); *H04W 52/0206* (2013.01); *H04W 52/0209* (2013.01); *H04W 52/0212* (2013.01); *H04W 52/0245* (2013.01); *H04W 68/00* (2013.01); *H04W 72/005* (2013.01); *H04W 72/042* (2013.01); *H04W 72/046* (2013.01); *H04W 72/0413* (2013.01); *H04W 72/0446* (2013.01); *H04W 92/02* (2013.01); *H04L 1/0026* (2013.01); *H04W 88/08* (2013.01); *Y02B 60/50* (2013.01); *Y02E 40/62* (2013.01)

(56) References Cited

U.S. PATENT DOCUMENTS

| | | | |
|---|---|---|---|
| 2005/0063331 A1 | 3/2005 | Kim et al. | |
| 2007/0104138 A1 | 5/2007 | Rudolf et al. | |
| 2008/0084941 A1 | 4/2008 | Mohanty et al. | |
| 2010/0009675 A1 | 1/2010 | Wijting et al. | |
| 2011/0169107 A1 | 7/2011 | Kramer et al. | |
| 2011/0202656 A1 | 8/2011 | Gentile et al. | |
| 2011/0299454 A1 | 12/2011 | Krishnaswamy | |
| 2012/0155404 A1 | 6/2012 | Shin et al. | |
| 2012/0207094 A1* | 8/2012 | Liao | H04W 4/005 370/328 |
| 2012/0302230 A1 | 11/2012 | Lim et al. | |
| 2013/0053075 A1* | 2/2013 | Yoshizawa | H04W 74/085 455/500 |
| 2013/0115893 A1* | 5/2013 | Hietalahti | H04W 48/02 455/68 |
| 2013/0268665 A1* | 10/2013 | Kips | H04M 3/42 709/224 |
| 2013/0311640 A1 | 11/2013 | Gleixner et al. | |
| 2014/0003313 A1 | 1/2014 | Jain et al. | |

FOREIGN PATENT DOCUMENTS

| | | |
|---|---|---|
| GB | 2476415 A | 6/2011 |
| JP | 2004040651 A | 2/2004 |
| JP | 2015523028 A | 8/2015 |
| KR | 20090073144 A | 7/2009 |
| KR | 20110092875 A | 8/2011 |
| TW | 201236482 A1 | 9/2012 |
| TW | 201410051 A | 3/2014 |
| TW | 201528845 A | 7/2015 |
| WO | WO-2011098150 A1 | 8/2011 |
| WO | WO-2011099769 A2 | 8/2011 |
| WO | WO-2011136266 A1 | 11/2011 |
| WO | WO-2012063042 A1 | 5/2012 |
| WO | WO-2014007990 A1 | 1/2014 |

OTHER PUBLICATIONS

"3rd Generation Partnership Project; Technical Specification Group Services and System Aspects; Architecture enhancements to facilitate communications with packet data networks and applications (Release 11)", 3GPP TS 23.682 V11.1.0., The European Telecommunications Standards Institute, (Jun. 2012), 27 pgs.

"3rd Generation Partnership Project; Technical Specification Group Services and System Aspects; System Improvements for Machine-Type Communications (Release 11)", 3GPP TR 23.888 V1.6.1, (2012).

"U.S. Appl. No. 13/755,166, Non Final Office Action mailed Jul. 10, 2014", 10 pgs.

"U.S. Appl. No. 13/755,166, Notice of Allowance mailed Nov. 21, 2014", 5 pgs.

"U.S. Appl. No. 13/755,166, Response filed Oct. 06, 2014 to Non-Final Office Action dated Jul. 10, 2014", 9 pgs.

"Belgium Application Serial No. 2013/0464, Belgium Search Report mailed Jul. 2, 2014", 9 pgs.

"Device triggering during suppression", Korea Telecom 3gpp Draft; S2-113350 S2 86 Device Triggering During S Uppression V2.2, 3rd Generation Partnership Project (3GPP), Mobile Competence Centre ; 650, Route Des Lucioles ; F-06921 Sophia-Antipolis Cedex ; France, Deel Sa Wg2, Nr. Naantali, (Jul. 5, 2011), 5 pgs.

"European Application Serial No. 13913471.3, Amendment filed Dec. 9, 2014", 16 pgs.

"Home Subscriber Server (HSS) diameter interfaces for interworking with packet data networks and applications", 3GPP TS 29.336 V0.2.0. Technical Specification Group Core Network and Terminals. Release 11., (Jun. 2012), 18 pgs.

"International Application Serial No. PCT/US2013/046564, International Preliminary Report on Patentability mailed Jan. 15, 2015", 7 pgs.

"International Application Serial No. PCT/US2013/046564, International Search Report mailed Oct. 11, 2013", 4 pgs.

"International Application Serial No. PCT/US2013/046564, Written Opinion mailed Oct. 11, 2013", 5 pgs.

"Netherlands Application Serial No. 2011078, Search Report mailed Jul. 1, 2014", 2 pgs.

"Netherlands Application Serial No. 2011078, Written Opinion mailed Jul. 1, 2014", 6 pgs.

"Solution for MTC Device Trigger indication from MTC Server", Sierra Wireless 3gpp draft; s2-111038 00295 device trigger solution, 3rd generation partnership project (3gpp), mobile competence centre ; 650, route des lucioles ; f-06921 sophia-antipolis cedex ; france, deel SA WG2, nr. Salt Lake City, (Feb. 26, 2011), 4 pgs.

"Spainish Application Serial No. P201330992, Office Action mailed Feb. 7, 2013", 5 pgs.

"Swedish Application Serial No. 1350812-2, Office Action mailed Jun. 17, 2014", 15 pgs.

"Taiwanese Application Serial No. 102123181, Office Action mailed Nov. 18, 2014", 11 pgs.

"Canadian Application Serial No. 2,874,475, Office Action mailed Jan. 20, 2016", 3 pgs.

"European Application Serial No. 13813471.3, Extended European Search Report mailed Jan. 26, 2016", 9 pgs.

"French Application Serial No. 1356408, Office Action mailed Dec. 4, 2015", not in English, 8 pgs.

"Generation Partnership Project; Technical Specification Group Core Network and Terminals; Home Subscriber Server (HSS) diameter interfaces for interworking with packet data networks and applications (Release 11)", 3GPP Standard; 3GPP TS 29.336, 3rd Generation Partnership Project (3GPP), Mobile Competence Centre ; 650, Route Des Lucioles ; F-06921 Sophia-Antipolis Cedex ; France, vol. CT W84, No. V0.2.0, (Jun. 27, 2012), 1-18.

"Japanese Application Serial No. 2015-520298, Office Action mailed Jan. 12, 2016", W/ English Translation, 6 pgs.

"Korean Application Serial No, 2014-7033794, Office Action mailed Jul. 17, 2015", w/ English Translation, 7 pgs.

(56) References Cited

OTHER PUBLICATIONS

"Korean Application Serial No. 2014-7033794, Response filed Sep. 15, 2015 to Office Action mailed Jul. 17, 2015", w/ English Claims, 16 pgs.

"Trigger in a generic format over T5", Nokia Siemens Networks, 3GPP Draft; S2-120802 T5 Generic Format, 3rd Generation Partnership Project (3GPP), Mobile Competence Centre ; 650, Route Des Lucioles ; F-06921 Sophia-Antipolis Cedex ; France, vol. SA WG2, no. Vancouver, Canada; 20120206-2012021, (Jan. 31, 2012).

"ZTE, Architecture Considerations—some clarifications [online]", 3GPP TSG-SA WG2#88, <URL:http://www.3gpp.org/ftp/tsg_sa/WG2_Arch/TSGS2_88_San_Francisco/Docs/S2-114838.zip>, (Nov. 7, 2011), 11 pgs.

France Application Serial No. 1356408, Response filed Mar. 2, 2016 to Office Action mailed Dec. 4, 2015, not in English, 15 pgs.

Japanese Application Serial No. 2015-520298, Response filed Apr. 6, 2016 to Office Action mailed Jan. 12, 2016, w/ English Claims, 21 pgs.

Taiwanese Application Serial No. 104111623, Office Action mailed Apr. 25, 2016, w/ English Translation, 18 pgs.

Finland Application Serial No. 20135725, Office Action mailed May 16, 2016, 5 pgs.

"Update HSS based device trigger solution", 3GPP, TSG SA WG2 Meeting #86: TD S2-113082, (Jul. 15, 2011), 5 pgs.

\* cited by examiner

APPARATUS AND METHOD TO EFFICIENTLY SEND DEVICE TRIGGER MESSAGES

CROSS-REFERENCE TO RELATED APPLICATIONS

This application is a continuation of U.S. patent application Ser. No. 13/755,166, filed on Jan. 31, 2103, which claims priority to U.S. Provisional Patent Application Ser. No. 61/667,325, filed Jul. 2, 2012, both of which are incorporated herein by reference in their entirety.

TECHNICAL FIELD

Embodiments pertain to wireless communications. Some embodiments pertain to wireless communications used in Long-Term Evolution (LTE) networks.

BACKGROUND ART

Device triggering is the means by which a service capability server (SCS) sends information to a piece of user equipment (UE) via a network to trigger the UE to perform application specific actions.

A large number of device triggering messages, coupled with small data requests, may cause signaling surge in the network and have an impact on the battery life of a UE if the UE toggles between an idle state and a connected state. This is especially true for mobile data applications that send device trigger messages with a small amount data frequently.

DESCRIPTION OF THE EMBODIMENTS

Figure 1:
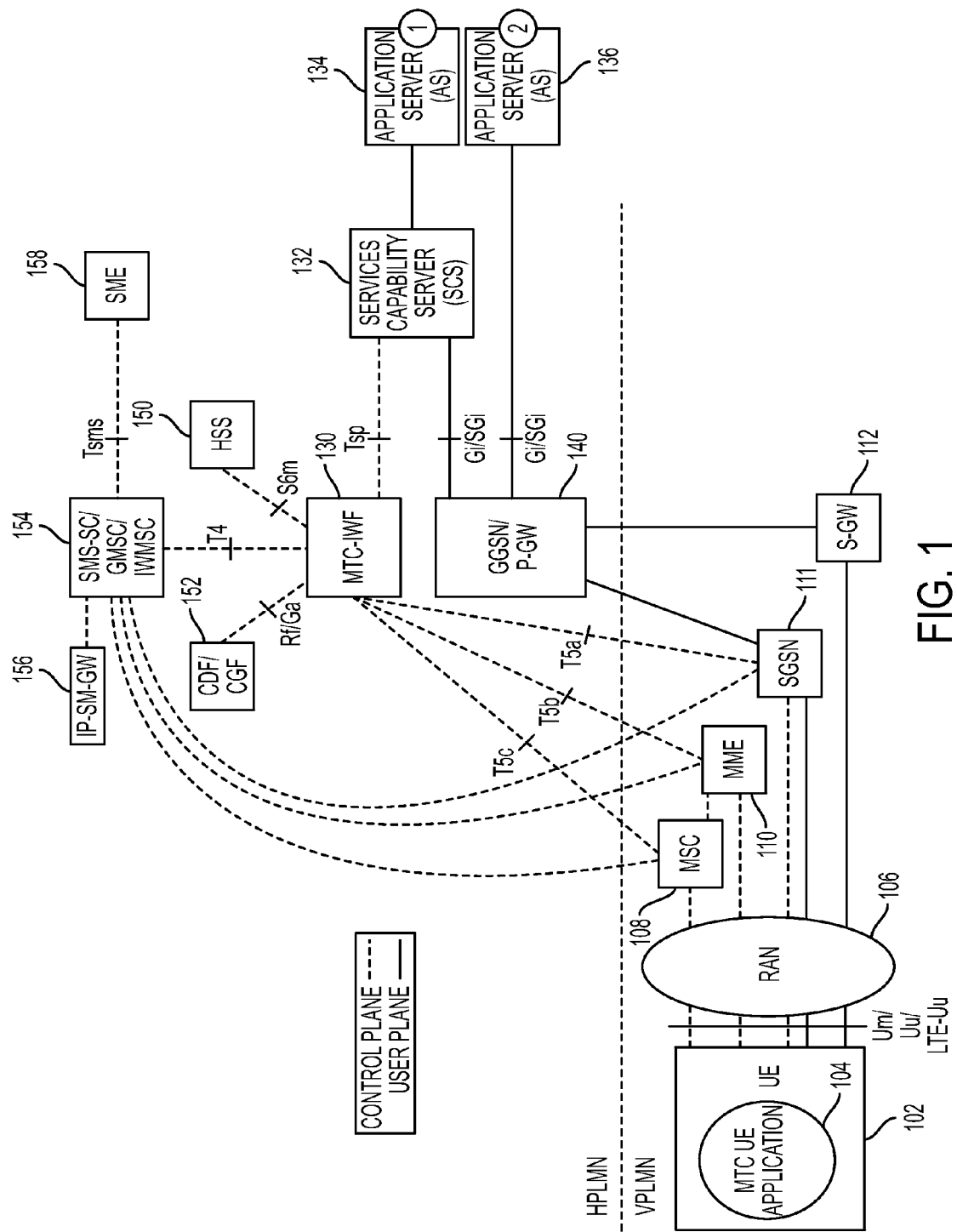
FIG. 1 is an illustrated overview of an embodiment of the present invention.

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

In the following detailed description, numerous specific details are set forth in order to provide a thorough understanding of the invention. However, it will be understood by those skilled in the art that the present invention may be practiced without these specific details. In other instances, well-known method, procedures, components, and circuits have not been described in detail so as not to obscure the present invention.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, and the like. For example, "a plurality of stations" may include two or more stations.

The 3rd Generation Partnership Project (3GPP) is a collaboration agreement established in December 1998 to bring together a number of telecommunications standards bodies, known as "Organizational Partners," that currently include the Association of Radio Industries and Business (ARIB), the China Communications Standards Association (CCSA), the European Telecommunications Standards Institute (ETSI), the Alliance for Telecommunications Industry Solutions (ATIS), the Telecommunications Technology Association (TTA), and the Telecommunication Technology Committee (TTC). The establishment of 3GPP was formalized in December 1998 by the signing of the "The 3rd Generation Partnership Project Agreement."

3GPP provides globally applicable standards as Technical Specifications and Technical Reports for a 3rd Generation Mobile System based on evolved GSM core networks and radio access technologies that they support (e.g., Universal Terrestrial Radio Access (UTRA) for both Frequency Division Duplex (FDD) and Time Division Duplex (TDD) modes). 3GPP also provides standards for maintenance and development of the Global System for Mobile communication (GSM) as Technical Specifications and Technical Reports including evolved radio access technologies (e.g., General Packet Radio Service (GPRS) and Enhanced Data rates for GSM Evolution (EDGE)). Technical Specifications for current standards related to mobile telephony are generally available to the public from the 3GPP organization.

3GPP is currently studying the evolution of the 3G Mobile System and considers contributions (views and proposals) directed toward the evolution of the UTRA Network (UTRAN). A set of high-level requirements was identified by 3GPP workshops including: reduced cost per bit; increased service provisioning (i.e., more services at lower cost with better quality); flexibility of use of existing and new frequency bands; simplified architecture with open interfaces; and reduced/reasonable terminal power consumption. A study on the UTRA & UTRAN Long Term Evolution (UTRAN-LTE, also known as 3GPP-LTE and E-UTRA) was started in December 2004 with the objective to develop a framework for the evolution of the 3GPP radio-access technology towards a high-data-rate, low-latency and packet-optimized radio-access technology. The study considered modifications to the radio-interface physical layer (downlink and uplink) such as means to support flexible transmission bandwidth up to 20 MHz, introduction of new transmission schemes, and advanced multi-antenna technologies.

3GPP-LTE is based on a radio-interface incorporating orthogonal frequency division multiplex (OFDM) techniques. OFDM is a digital multi-carrier modulation format that uses a large number of closely-spaced orthogonal subcarriers to carry respective user data channels. Each subcarrier is modulated with a conventional modulation scheme, such as quadrature amplitude modulation (QAM), at a (relatively) low symbol rate when compared to the radio frequency (RF) transmission rate. In practice, OFDM signals are generated using the fast Fourier transform (FFT) algorithm.

Machines often need to communicate with other machines without little or no human intervention. In the past, such communications were made via wire. As time went on, wireless communications began to be used. With the increased availability of mobile broadband, machine type communications (MTC) via broadband is becoming more and more popular. MTC enables communications between remote machines for exchanging information and operating commands without the need for human intervention. Exemplary uses of machine-type communications include remote sensors, e-health, remote-controlled utility meters, surveillance cameras, toll payments, production chain automation, and the like. For example, a device can monitor the operation status of another device and report the statuses to a central server. Or a device can read a utility meter and provide the data to a billing department for the preparation of monthly utility bills.

When a server wishes to activate or trigger a certain MTC device, it may transmit a device trigger message over the service network. The device trigger message may be configured to initiate communication between the MTC device and the server.

Sending device trigger messages is the means by which a Services Capability Server (SCS) sends information to the User Equipment (UE) via the 3GPP network to trigger the UE to perform application specific actions. These actions may include initiating communication with the SCS for the indirect model or an Application Server (AS) in the network for the hybrid model. Device Triggering may be required when an IP address for the UE is not available or reachable by the SCS/AS.

A device trigger message typically contains information (e.g., IMSI<Application port ID, and the like) that allows the network to route the message to the appropriate UE and for the UE to route the message to the appropriate application. The information destined to the application is referred to as the device trigger payload. The UE is arranged to be able to distinguish between a message that contains device triggering information from any other type of message.

Upon reception by the UE, the device trigger payload is examined to determine the information that triggers application related actions. The application in the UE may perform certain indicated actions, such as to initiate an immediate connection or to make a later communication to the SCS or AS, based on the information in the trigger payload.

A Charging Data Record (CDR) may be collected for the device triggering. That is, the provider may keep track of the cost of the data transmission for future billing purposes.

With reference to FIG. 1, a block diagram illustrating the architecture for Machine Type Communication (MTC) under 3GPP is shown.

A UE 102 is shown as executing an MTC UE application 104. The UE is coupled to a Radio Access Network (RAN) 106. Via RAN 106, the UE is coupled to various components of the Evolved Packet Core, such as Mobile Switching Center (MSC) 108, Mobile Management Entity (MME) 110, Serving GPRS Support node (SGSN) 111 and Serving Gateway (S-GW) 112. Together, these components comprise the Visited Public Land Mobile Network (VPLMN). Components in the Home Public Land Mobile Network (HPLMN) are coupled to the above components via several reference points.

MME 110, along with SGSN 111 may be arranged to perform the following functionality: receive a device trigger message from MTC-IWF; encapsulate device trigger information in a NAS message sent to the UE used for MTC; receive device trigger acknowledgement from the triggering UE; report device trigger delivery success/failure status to MTC-IWF; and provide SGSN/MME congestion/load information to MTC-IWF.

Reference point Tsp (120) is used by a services capability server to communicate with an MTC InterWorking Function (MTC-IWF) 130. Reference point T5*a* (122) is used to couple MTC-IWF and SGSN 111. Reference point T5*b* (124) is used to couple MTC-IWF and a serving MME. Reference point T5*c* (126) is used to couple MTC-IWF and a serving MSC. Reference point S6*m* (128) is used to couple MTC-IWF and the Home Subscriber Server.

An MTC-IWF 130 may be a standalone entity or a functional entity located within another network entity. An MTC-IWF may reside in a Home Public Land Mobile Network (HPLMN). MTC-IWF may have many different functions, including, but not limited to: termination of the Tsp, S6*m* and Rf/Ga reference points; termination of one or more reference points among T4, T5*a*, T5*b* and T5*c*; ability to authorize the SCS before communication establishment with the 3GPP network; ability to authorize control plane requests from an SCS.

MTC-IWF 130 may also support the following device trigger functionalities: reception of a device trigger request from SCS; report to the SCS the acceptance or non-acceptance of the device trigger request; report to the SCS the success or failure of a device trigger delivery; may apply MTC-IWF and/or SGSN/MME induced congestion/load control as part of the response to trigger requests; and uses a standardised identifier (e.g. Application Port ID) to allow the UE to distinguish an MT message carrying device triggering information from any other type of messages.

MTC-IWF 130 may also support: a Home Subscriber Server (HSS) resolution mechanism for use when multiple and separately addressable HSSs have been deployed by the network operator; interrogation of the appropriate HSS, when needed for device triggering, to: a) map E.164 MSISDN or External Identifier to IMSI; b) retrieve serving node information for the UE (e.g. serving SGSN/MME/MSC identifier); and c) determine if a SCS is allowed to send a device trigger to a particular UE.

MTC-IWF 130 may also support selection of the most efficient and effective device trigger delivery mechanism and shielding of this detail from SCS based on: current UE serving node information from HSS/HLR (e.g. serving MME/SGSN/MSC identifier); the device trigger delivery mechanisms supported by the UE; the possible device trigger delivery services supported by the HPLMN and, when roaming, VPLMN; operator defined device trigger delivery policies, if any; and/or optionally, any information received from the SCS; protocol translation, if necessary, and forwarding towards the relevant network entity (i.e. serving SGSN/MME/MSC or SMS-SC inside HPLMN domain) of a device trigger request to match the selected trigger delivery mechanism; generation of device trigger CDRs with External Identifier and SCS Identifier and forwarding to CDF/CGF over instance of Rf/Ga; and ability for secure communications between the 3GPP network and the SCS.

Although only a single MTC-IWFs is illustrated in FIG. 1, it should be understood that multiple MTC-IWFs may operate within a single HPLMN.

Home Subscriber Server (HSS) 150 may be configured to support the following functionalities: termination of the S6*m* reference point where MTC-IWFs connect to the Home Location Register (HLR)/HSS; stores and provides to MTC-IWF (and optionally to MTC AAA) the mapping/lookup of the Mobile Station International Subscriber Data Number (MSISDN) or external identifier(s) to International Mobile Subscriber Identify (IMSI) and subscription information used by MTC-IWF for device triggering; mapping of MSISDN or external identifiers to IMSI; optionally, mapping from External Identifiers to MSISDN is also provided for legacy SMS infrastructure not supporting MSISDN-less SMS; HSS stored "Routing information" including serving node information if available for the UE (e.g. serving SGSN/MME/MSC identifier); and determine if a SCS is allowed to send a device trigger to a particular UE; termination of the S6*n* reference point; provides to MTC-AAA the mapping between IMSI and External Identifier(s).

Services Capability Server 132 is arranged to couple an application server 134 to MTC-IWF 130 in an indirect model. In a direct model, application server 136 is coupled directly to the operator network in order to perform direct user plane communications with the UE without the use of an external SCS.

As explained above, a large amount of device triggering, coupled with small data requests, can cause a signaling surge in the network. This can lead to a negative impact on the battery life of a piece of user equipment (UE) because the UE may have to toggle between an idle and a connected state more often than required. There are several possible solutions.

Figure 2:
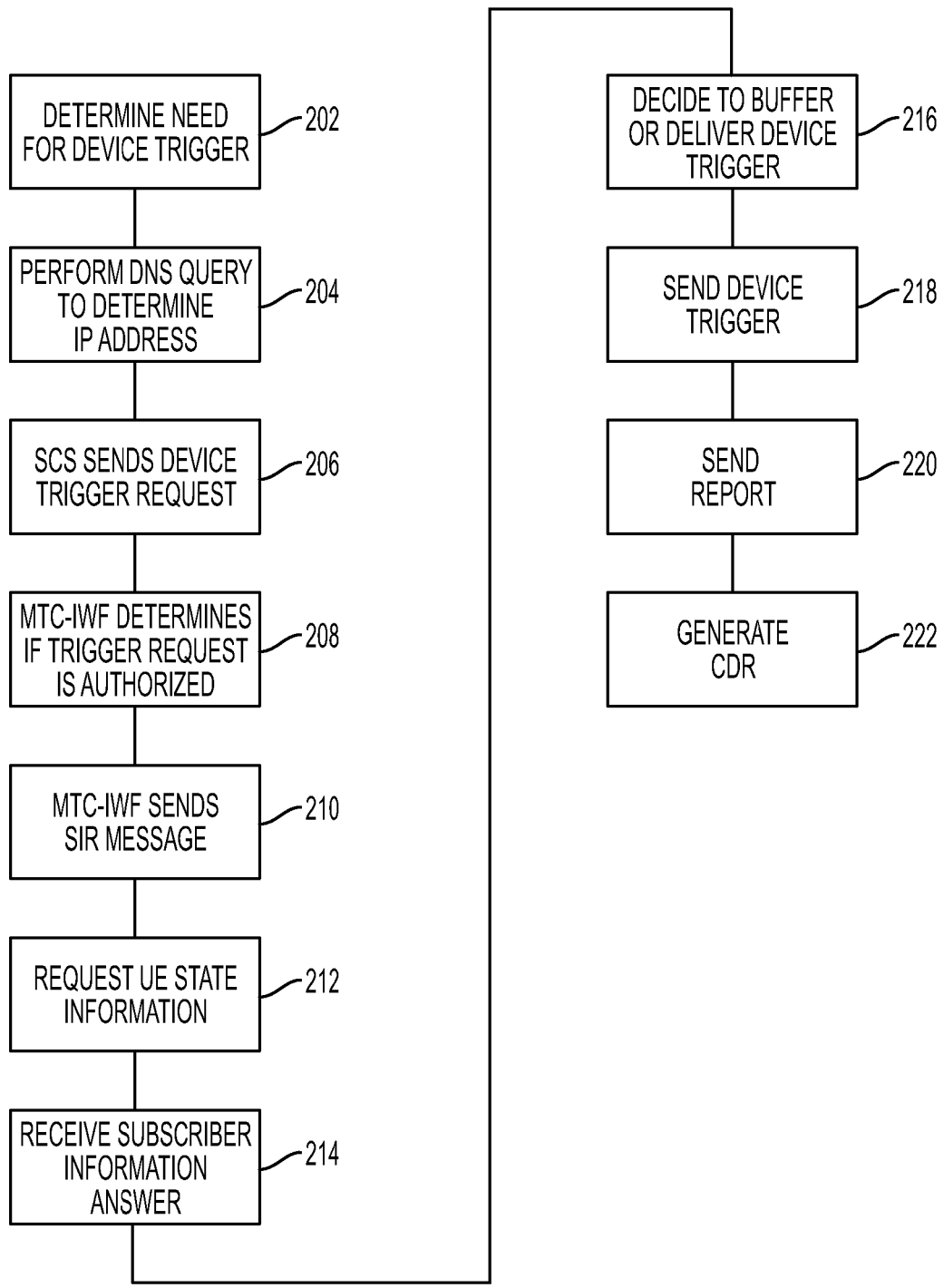
FIG. 2 is a flowchart illustrating the operation of an embodiment of the present invention.

With reference to FIG. 2, a flowchart presenting an embodiment is shown. In this embodiment, the MTC Inter-Working Function (MTC-IWF) obtains the state of the UE from a home subscriber service (HSS), using an indirect model.

A Services Capability Server (SCS) determines the need to trigger the device (202). If the SCS has no contact details for an MTC-IWF, it may first determine the IP address(es)/port(s) of an MTC-IWF by performing a DNS query using the External Identifier or using a locally configured MTC-IWF identifier (204).

Thereafter, the SCS sends a Device Trigger Request message to the MTC-IWF (206). The message may contain information such as an External Identifier or MSISDN, SCS Identifier, trigger reference number, validity period, priority, Application Port ID, trigger payload, and the like. The SCS includes a Trigger Payload that may contain the information destined for the MTC application, along with the information to route it to the MTC application. The Application Port ID is set to address a triggering function within the UE.

It should be noted that terms such "Device Trigger Request" message is merely used for illustration. The actual name of the message used may differ.

The MTC-IWF checks that the SCS is authorized to send trigger requests and that the SCS has not exceeded its quota or rate of trigger submission over Tsp (208). If this check fails the MTC-IWF sends a Device Trigger Confirm message with a cause value indicating the reason for the failure condition and the flow stops at this step.

The MTC-IWF sends a Subscriber Information Request (SIR) message to the HSS to determine if SCS is authorized to trigger the UE. (External Identifier or MSISDN and SCS Identifier, UE State Information Request) to resolve the External Identifier or MSISDN to IMSI, retrieve the identities of the UE's serving CN node(s) (210). The UE State Information Request flag is set to request the UE state information (such as Idle, Connected, and registered) from HSS (212). This information also tells HSS to register for Reachability Notification in case UE is not reachable.

The MTC-IWF may be configured to perform cache authorization and routing information for the UE. However, this may increase the probability of trigger delivery attempt failures when the cached serving node information is stale.

The HSS sends the Subscriber Information Answer (IMSI and serving node(s) identities, UE State Information) message (214). HSS policy may influence which serving node identities are returned. If the cause value indicates the SCS is not allowed to send a trigger message to this UE or valid subscription information was not returned by the HSS, the MTC-IWF sends a Device Trigger Confirm message with a cause value indicating the reason for the failure condition and the flow stops. Otherwise, this flow continues.

If the UE is not reachable, HSS may not send serving nodes identities or state information which provides implicit indication that UE is not reachable and MTC-IWF in this case will store the trigger if validity period does not indicate single attempt delivery.

Thereafter, the MTC-IWF obtains the state of UE in the Subscriber Information Answer message and decides whether to buffer the trigger message or to deliver it (216). This process may take place in one of several different manners. One example is detailed further with respect to FIG. 3. When the MTC-IWF decides to send the device trigger message, it selects a trigger delivery procedure based on the information received from HSS and local policy. The delivery procedure is selected and the MTC-IWF attempts a trigger delivery procedure (218).

The MTC-IWF sends the Device Trigger Report (External Identifier or MSISDN and trigger reference number) message to the SCS with a cause value indicating whether the trigger delivery succeeded or failed and the reason for the failure (220). The MTC-IWF generates the necessary CDR information including the External Identifier or MSISDN and SCS Identifier (222).

In response to the received device trigger, the UE takes specific actions that take into consideration the content of the trigger payload (224). This response typically involves initiation of immediate or later communication with the SCS or an AS. This action depends on the nature of the UE being tasked.

Figure 3:
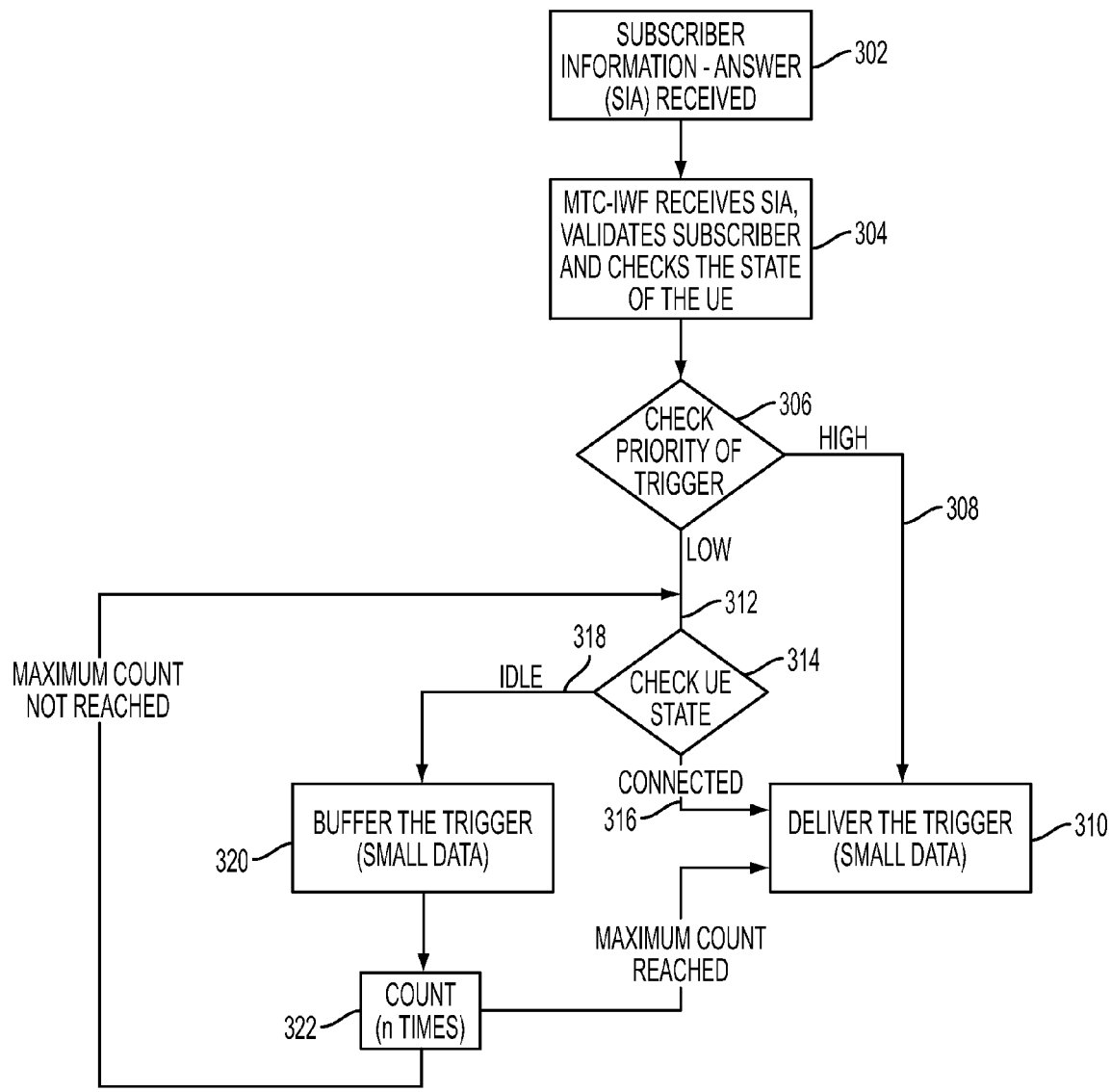
FIG. 3 is a flowchart illustrating the operation of another embodiment of the present invention.

With reference to FIG. 3, a flowchart presenting the MTC-IWF behavior upon receiving the UE state information. After receiving the Subscriber Information Answer message (302), the MTC-IWF validates the subscriber and checks the state of the UE (304). The priority of the device trigger is then checked (306). If the device trigger is high (308), then the device trigger is delivered (310). If the priority is low (312), then the UE state is checked (314). If the UE is connected (316), then the device trigger is delivered (310). If the UE is idle (318), then the device trigger is buffered (320). Then a counter is incremented (322). If the counter has reached its maximum amount, the device trigger is delivered (310). Otherwise, the process of checking the UE state is repeated (314). The counter can be set to be any number that would allow for the efficient transmission of device trigger messages. Following such a procedure waits for the destination UE of the device trigger message to move from an idle state to a connected on its own, before forcing the UE to enter the connected state to receive the device trigger message.

Based on the solutions provided above, the UE State Information Request flag can either be contained in an SIR (Subscriber Information Request) or in a new USIR (User State Information Request) message. Correspondingly, SIA (Subscriber Information Answer) or the new USIA (User State Information Answer) will contain the present UE state information answer.

SIR and SIA are existing messages that are defined in TS 29.336 of release 11 of the 3GPP standard. These messages will be enhanced in order to reflect the UE state Information as follows. SIR will have new Attribute Value Pair (AVP) for the UE State Information Request flag; SIA will have new AVP for UE State Information Answer. USIR and USIA are new messages that will be defined in future documents.

The User-State information can be one of the following states of the UE:
DETACHED
ATTACHED_NOT_REACHABLE_FOR_PAGING
ATTACHED_REACHABLE_FOR_PAGING
CONNECTED_NOT_REACHABLE_FOR_PAGING
CONNECTED_REACHABLE_FOR_PAGING
NETWORK_DETERMINED_NOT_REACHABLE New state information can also be added as needed. For example, EMM_IDLE and EMM_CONNECTED). The HSS may not know the UE MM state information. In such a case, the HSS notification procedure can be enhanced to store other UE state information, such as UE MM, SM state, and the like.

Figure 4:
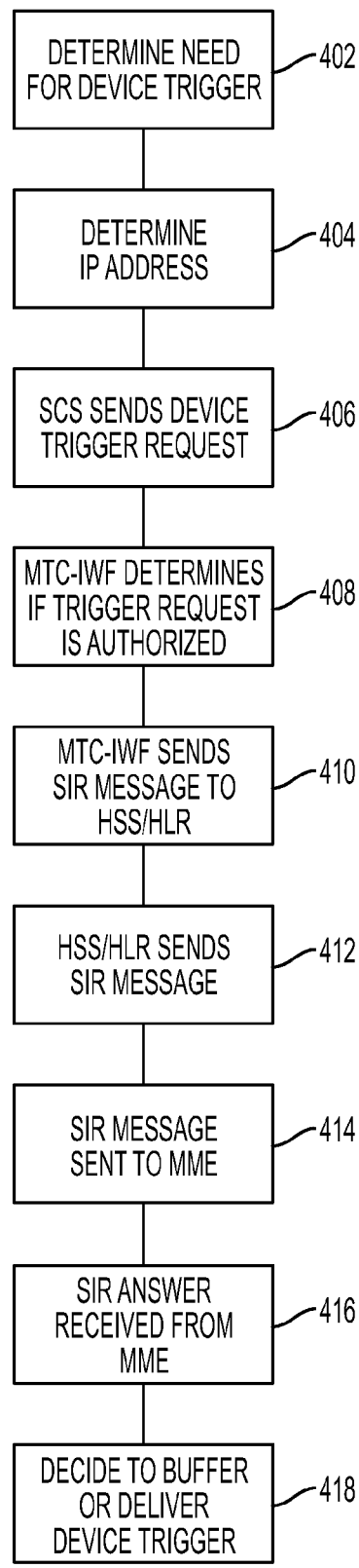
FIG. 4 is a flowchart illustrating the operation of another embodiment of the present invention.

With reference to FIG. 4, a flowchart presenting the operation of an embodiment in which the MTC-IWF obtains the UE state from a Mobility Management Entity (MME).

A Services Capability Server (SCS) determines the need to trigger the device (402). If the SCS has no contact details for an MTC-IWF, it may first determine the IP address(es)/port(s) of an MTC-IWF by performing a DNS query using the External Identifier or using a locally configured MTC-IWF identifier (404).

Thereafter, the SCS sends a Device Trigger Request message to the MTC-IWF (406). The message may contain information such as an External Identifier or MSISDN, SCS Identifier, trigger reference number, validity period, priority, trigger payload, and the like. The SCS includes a Trigger Payload that may contain the information destined for the MTC application, along with the information to route it to the MTC application.

The MTC-IWF checks that the SCS is authorized to send trigger requests and that the SCS has not exceeded its quota or rate of trigger submission over Tsp (408). If this check fails the MTC-IWF sends a Device Trigger Confirm message with a cause value indicating the reason for the failure condition and the flow stops at this step.

The MTC-IWF sends a Subscriber Information Request (External Identifier or MSISDN and SCS Identifier) message to the HSS/HLR to determine if the SCS is authorized to trigger the UE, to resolve the External Identifier or MSISDN to IMSI and retrieve the related HSS stored "Routing information" including the identities of the UE's serving CN node(s) (410).

The HSS/HLR sends the Subscriber Information Response (IMSI and/or MSISDN and related "Routing information" including the serving node(s) identities, cause) message (412). The HSS/HLR policy (possibly dependent on the VPLMN ID) may influence which serving node identities are returned. If the cause value indicates the SCS is not allowed to send a trigger message to this UE, or there is no valid subscription information, the MTC-IWF sends a Device Trigger Confirm message with a cause value indicating the reason for the failure condition and the flow stops at this step.

The user state information Request message is sent from the MTC-IWF to the MME, requesting the state of the UE (414). The information contained in this message is as explained above with respect to FIG. 2.

The User state information Answer message is sent as a reply to the request from the MME, notifying it of the state of the UE (416). The information contained in this message is again as explained above with respect to FIG. 2.

The MTC-IWF now decides whether to buffer the trigger message or to deliver it, using the method explained above with respect to FIG. 3 (418). After the MTC-IWF decides to send the trigger, it selects trigger delivery procedure based on the information received from HSS and local policy. The T5 delivery procedure is selected and MTC-IWF attempts a T5 trigger delivery procedure.

Figure 5:
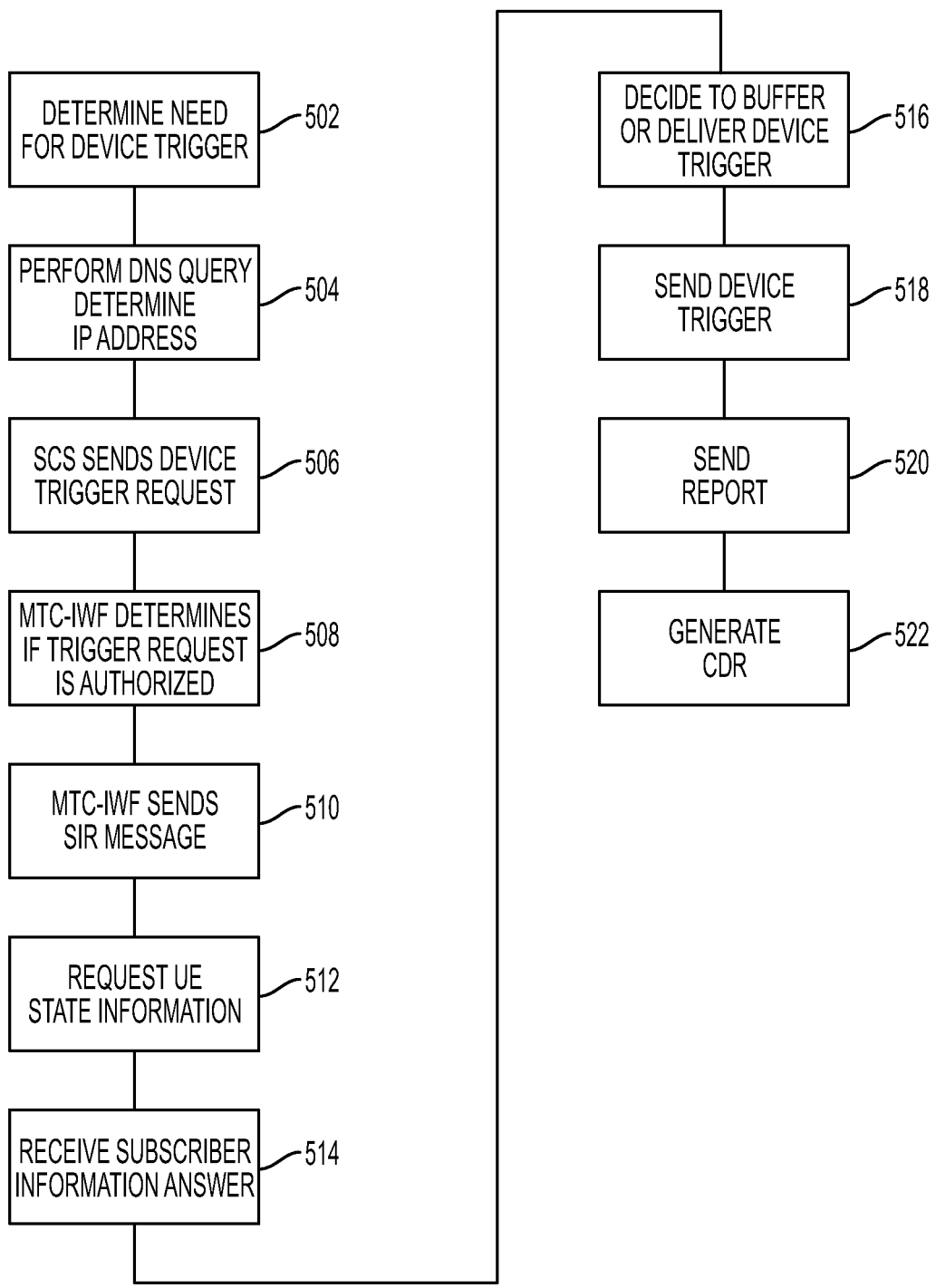
FIG. 5 is a flowchart illustrating the operation of another embodiment of the present invention.

With reference to FIG. 5, a flowchart presenting the operation of an embodiment in which the MTC-IWF obtains the UE state from a Presence Server.

A Services Capability Server (SCS) determines the need to trigger the device (502). If the SCS has no contact details for an MTC-IWF, it may first determine the IP address(es)/port(s) of an MTC-IWF by performing a DNS query using the External Identifier or using a locally configured MTC-IWF identifier (504).

Thereafter, the SCS sends a Device Trigger Request message to the MTC-IWF (506). The message may contain information such as an External Identifier or MSISDN, SCS Identifier, trigger reference number, validity period, priority, trigger payload, and the like. The SCS includes a Trigger Payload that may contain the information destined for the MTC application, along with the information to route it to the MTC application.

The MTC-IWF checks that the SCS is authorized to send trigger requests and that the SCS has not exceeded its quota or rate of trigger submission over Tsp (508). If this check fails the MTC-IWF sends a Device Trigger Confirm message with a cause value indicating the reason for the failure condition and the flow stops at this step.

The MTC-IWF sends a Subscriber Information Request (External Identifier or MSISDN and SCS Identifier) message to the HSS/HLR to determine if the SCS is authorized to trigger the UE, to resolve the External Identifier or MSISDN to IMSI and retrieve the related HSS stored "Routing information" including the identities of the UE's serving CN node(s) (510).

The HSS/HLR sends the Subscriber Information Response (IMSI and/or MSISDN and related "Routing information" including the serving node(s) identities, cause) message (512). The HSS/HLR policy (possibly dependent on the VPLMN ID) may influence which serving node identities are returned. If the cause value indicates the SCS is not allowed to send a trigger message to this UE, or there is no valid subscription information, the MTC-IWF sends a Device Trigger Confirm message with a cause value indicating the reason for the failure condition and the flow stops at this step.

The User State Information Request message is sent from the MTC-IWF to the Presence Server, requesting the state of the UE (514). The information contained in this message is as explained above. MTC-IWF can be preconfigured with the address of the presence server. This step can happen in parallel with 510.

The User state information Answer message is sent as a reply to the request from the Presence Server, notifying it of the state of the UE (516). The information contained in this message is as explained above.

The MTC-IWF now decides whether to buffer the trigger message or to deliver it (518). This may be done following the method described above with respect to FIG. 3. After the MTC-IWF decides to send the trigger, the MTC-IWF attempts T5 trigger delivery procedure (520).

In some embodiments MTC-IWF may be arranged to communicate directly with the UE and store the UE state information. In this case, UE sends the state information directly to MTC-IWF and the MTC-IWF discovery mechanism by UE can be same as Presence Server discovery mechanism by UE. In some embodiments MTC-IWF and Presence Server can be co-located or implemented in same box. In such an embodiment, not all functionality needs to be implemented in the same box. In other words, it may be possible to implement part of functionality of Presence Server in MTC-IWF.

Figure 6:
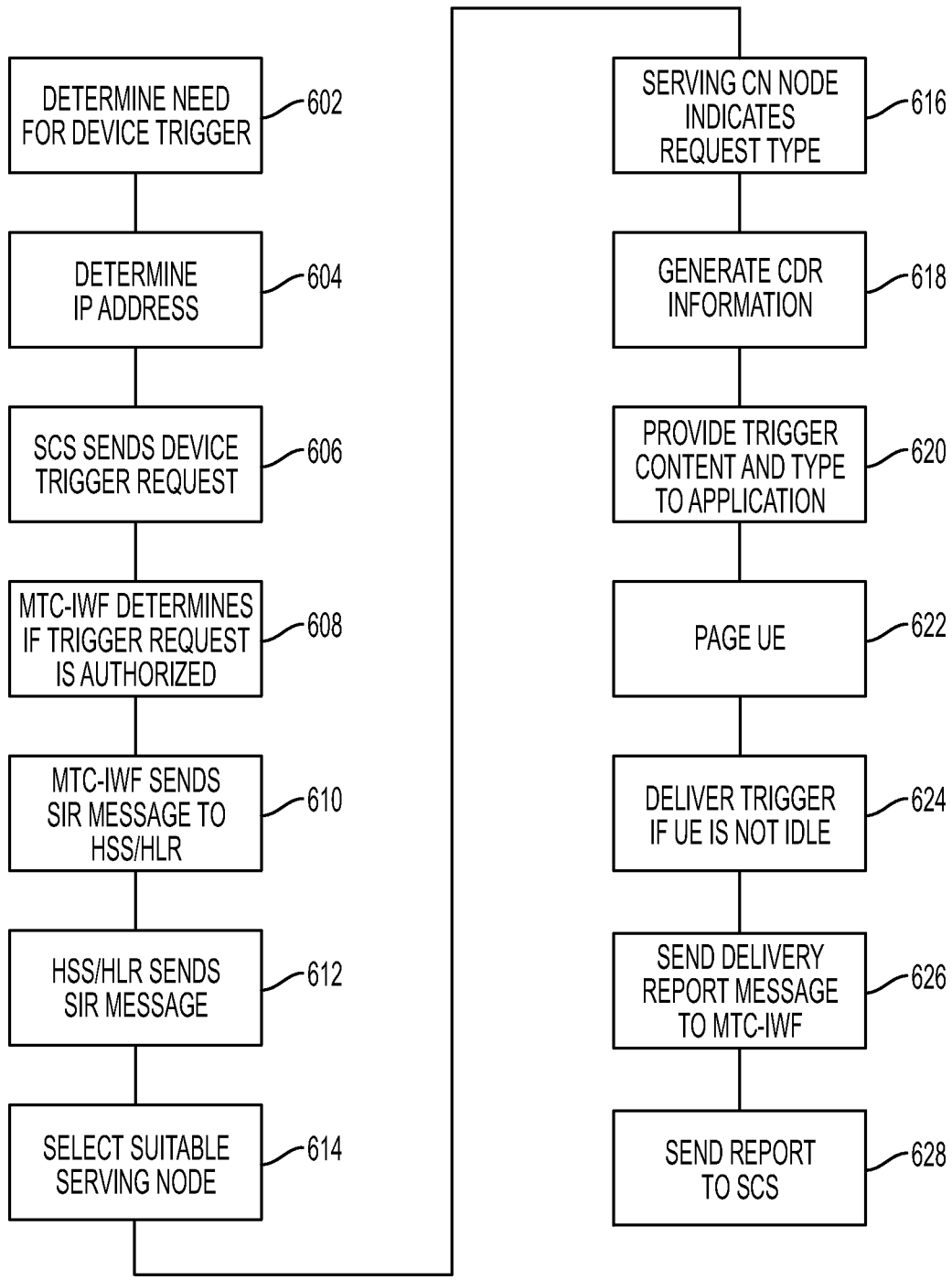
FIG. 6 is a flowchart illustrating the operation of another embodiment of the present invention.

With reference to FIG. 6, a flowchart presenting the operation of an embodiment in which the MTC-IWF buffers the trigger in the MME. It should be noted that the MME is merely exemplary. The buffering node could also be SGSN or MSC.

A Services Capability Server (SCS) determines the need to trigger the device (602). If the SCS has no contact details for an MTC-IWF, it may first determine the IP address(es)/port(s) of an MTC-IWF by performing a DNS query using the External Identifier or using a locally configured MTC-IWF identifier (604).

Thereafter, the SCS sends a Device Trigger Request message to the MTC-IWF (606). The message may contain information such as an External Identifier or MSISDN, SCS Identifier, trigger reference number, validity period, priority, trigger payload, and the like. The SCS includes a Trigger Payload that may contain the information destined for the MTC application, along with the information to route it to the MTC application.

The MTC-IWF checks that the SCS is authorized to send trigger requests and that the SCS has not exceeded its quota or rate of trigger submission over Tsp (608). If this check fails the MTC-IWF sends a Device Trigger Confirm message with a cause value indicating the reason for the failure condition and the flow stops at this step.

The MTC-IWF sends a Subscriber Information Request (External Identifier or MSISDN and SCS Identifier) message to the HSS/HLR to determine if the SCS is authorized to trigger the UE, to resolve the External Identifier or MSISDN to IMSI and retrieve the related HSS stored "Routing information" including the identities of the UE's serving CN node(s) (610).

The HSS/HLR sends the Subscriber Information Response (IMSI and/or MSISDN and related "Routing information" including the serving node(s) identities, cause) message (612). The HSS/HLR policy (possibly dependent on the VPLMN ID) may influence which serving node identities are returned. If the cause value indicates the SCS is not allowed to send a trigger message to this UE, or there is no valid subscription information, the MTC-IWF sends a Device Trigger Confirm message with a cause value indicating the reason for the failure condition and the flow stops at this step.

The MTC-IWF uses the UE capabilities, serving Core Network (CN) node(s) capabilities retrieved from the HSS to select a suitable serving CN node capable of T5 triggering (614). The MTC-IWF sends a Submit Request to the serving CN node. The Submit Request may contain IMSI, message priority, MTC-IWF ID, reference number, single delivery attempt flag (optional), validity time (optional), Request type (trigger application), application PDU. If there is more than one serving CN node, the MTC-IWF should send the message to the serving CN node where the UE is currently camping with highest probability. This may be, for example, based on information received from HSS or cached information from earlier trigger attempts.

The serving CN node indicates the Request type (trigger application), application PDU, MTC-IWF ID, Reference number within the NAS message and delivers it to the UE (616). The serving CN node generates the necessary CDR information (618). The UE provides the trigger content and trigger type to the corresponding application (620).

If the UE is in idle mode, the serving CN node may page the UE prior to sending a NAS message for delivering the trigger (622). If the UE is not in idle mode, it delivers the trigger (624).

If the UE is in idle mode, the MME decides whether to buffer the trigger message or to deliver it. This may be accomplished according to a method detailed later in FIG. 7 or in a variety of other different ways.

The serving CN node sends a Delivery Report message to the MTC-IWF (626). The Delivery Report may contain several pieces of information, including IMSI, cause, reference number, delivered by CN node, Response type (trigger application), and if received, application PDU, information about buffering in MME). Cause indicates whether the Trigger-Message was successfully delivered to the UE or if it was buffered, or if failed, the reason for the failure.

The MTC-IWF then sends a report to the SCS informing it of the actions taken (628).

Figure 7:
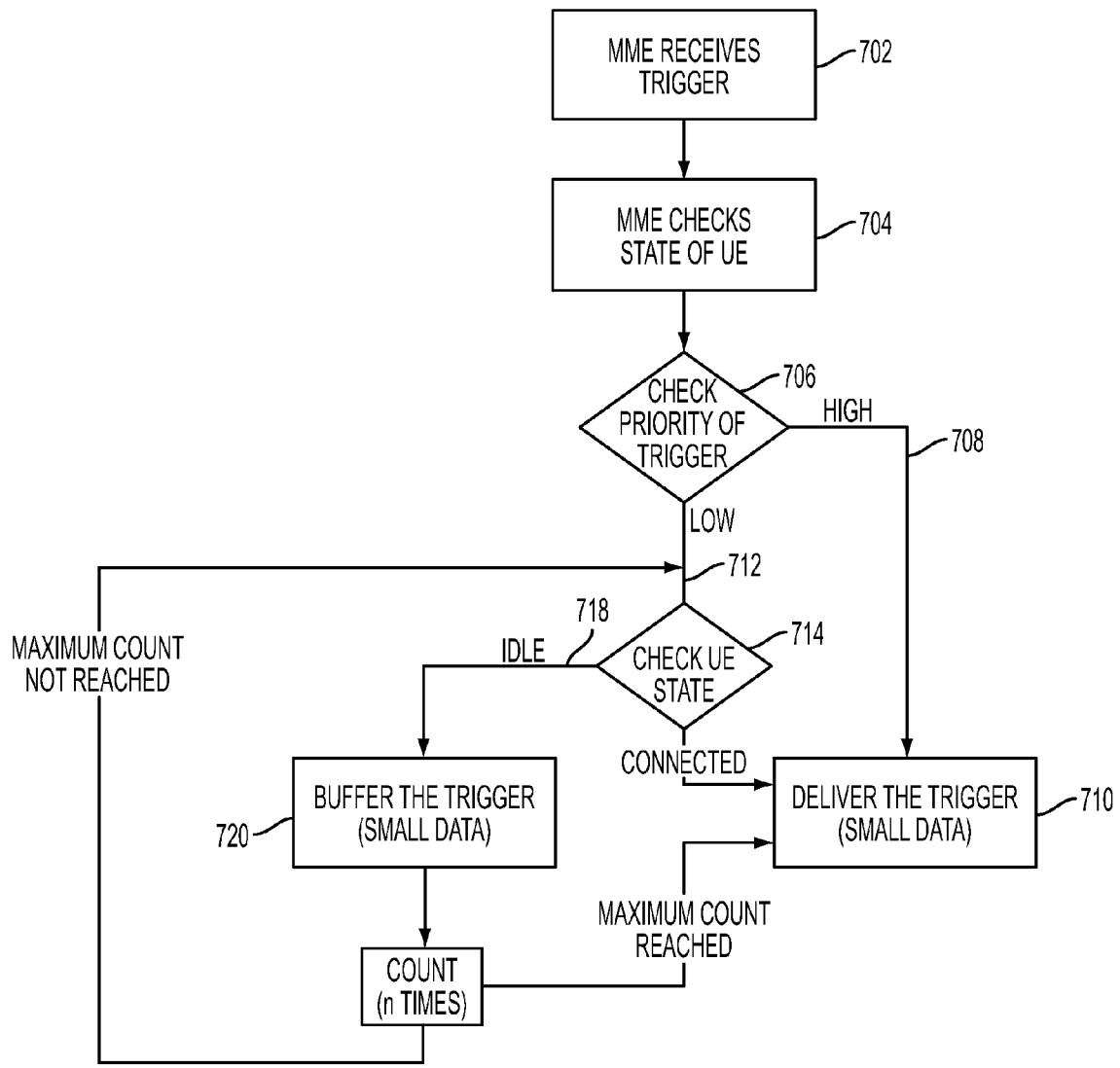
FIG. 7 is a flowchart illustrating the operation of another embodiment of the present invention.

With reference to FIG. 7, a flow chart illustrating the behavior of the MME depending on the status of the UE. After receiving the trigger (702), the MME checks the state of the UE (704). The priority of the device trigger is then checked (706). If the device trigger is high (708), then the device trigger is delivered (710). If the priority is low (712), then the UE state is checked (714). If the UE is connected (716), then the device trigger is delivered (710). If the UE is idle (718), then the device trigger is buffered in the MME (720). Then a counter is incremented (722). If the counter has reached its maximum amount, the device trigger is delivered (710). Otherwise, the process of checking the UE state is repeated (714). The counter can be set to be any number that would allow for the efficient transmission of device trigger messages. Following such a procedure waits for the destination UE of the device trigger message to move from an idle state to a connected on its own, before forcing the UE to enter the connected state to receive the device trigger message.

The following examples pertain to further embodiments.

A Machine Type Communication Interworking Function (MTC-IWF) in an LTE network may comprise: a processor arranged to: receive a device trigger request via the LTE network; validate the device trigger request; request status information of a user equipment (UE) to which the device trigger is to be sent; receive the status information of the UE; and send the device trigger based on the status information; wherein the status information comprises information on the connection status of the UE. The status information may indicate if the UE is in an idle state or in a connected state. The MTC-IWF may be further arranged to: determine the priority of the device trigger request and send the device trigger message when the priority of the device trigger request is high. The MTC-IWF may be further arranged to: determine the priority of the device trigger request; and when the priority of the device trigger request is low: send the device trigger request when the UE is in a connected state; and buffer the device trigger request when the UE is in an idle state.

In another embodiment, a method for sending a device trigger message to a destination user equipment (UE) in an LTE network may comprise: receiving a request to send a device trigger message; determining the priority of the device trigger message; transmitting the device trigger message if the priority of the device trigger message is high; if the priority checking of the device trigger message is low, checking if the destination UE for the device trigger message is in a connected state; sending the device trigger message when the destination UE is in a connected state; otherwise buffering the device trigger message until the destination UE is in a connected state.

In one embodiment, the method is performed by a Machine Type Communications Interworking Function (MTC-IWF). In one embodiment the method is performed by a mobile management entity (MME).

In another embodiment, a method for sending a device trigger message in an LTE network may comprise: receiving a device trigger request; validating the device trigger request; requesting status information of the user equipment (UE) to which the device trigger is to be sent; receiving the status information of the UE; and sending the device trigger based on the status information; wherein the status information comprises information on the connection status of the UE.

In one embodiment, the status information indicates if the UE is in an idle state or in a connected state.

In one embodiment, sending the device trigger based on the status information comprises: determining the priority of the device trigger request; and sending the device trigger message when the priority of the device trigger request is high.

In one embodiment, sending the device trigger based on the status information comprises: determining the priority of the device trigger request; and when the priority of the device trigger request is low: sending the device trigger request when the UE is in a connected state; and buffering the device trigger request when the UE is in an idle state. In one embodiment, buffering the device trigger request is performed by a Mobile Management Entity (MME).

In one embodiment, the method may further comprise: creating a report detailing the sending of the device trigger; and creating a charging data record (CDR) based on the sending of the device trigger.

In one embodiment, the method is performed by a Machine Type Communication Interworking Function (MTC-IWF).

In one embodiment, requesting status information of the user equipment (UE) to which the device trigger is to be sent may comprise sending a subscriber information request (SIR) message to a Home Subscriber Server (HSS); and receiving the status information of the UE may comprise receiving a Subscriber Information Answer (SIA) message from the HSS.

In one embodiment, the SIR message comprises a state information request of the UE; and the SIA message may comprise state information of the UE.

In one embodiment, the state information comprises information regarding whether the UE is in an idle state or in a connected state.

In one embodiment, the state information is selected from the following: detached, Attached_Not_Reachable_For_Paging, Attached_Reachable_For_Paging, Connected_Not_Reachable_For_Paging, Connected_Reachable_For_Paging, and Network_Determined_Not_Reachable.

In one embodiment, requesting status information of the user equipment (UE) to which the device trigger is to be sent may comprise sending a subscriber information request (SIR) message to a Mobile Management Entity (MME); and receiving the status information of the UE comprises receiving a Subscriber Information Answer (SIA) message from the MME.

In one embodiment, requesting status information of the user equipment (UE) to which the device trigger is to be sent comprises sending a subscriber information request (SIR) message to a Presence Server; and receiving the status information of the UE comprises receiving a Subscriber Information Answer (SIA) message from the Presence Server.

In one embodiment, requesting status information of the user equipment (UE) to which the device trigger is to be sent may comprise sending a subscriber information request (SIR) message to a Home Subscriber Server (HSS); and receiving the status information of the UE comprises receiving a Subscriber Information Answer (SIA) message from the HSS.

In another embodiment, a method may comprise: receiving a device trigger request; validating the device trigger request; requesting status information of the user equipment (UE) to which the device trigger is to be sent; receiving the status information of the UE; and submitting a request to a mobile management entity to process the device trigger request.

In one embodiment, the method is performed by a Machine Type Communication Interworking Function (MTC-IWF).

While certain features of the invention have been illustrated and described herein, many modifications, substitutions, changes, and equivalents may occur to those skilled in the art. It is, therefore, to be understood that the appended claims are intended to cover all such modifications and changes as fall within the scope of the invention.

We claim:

1. A user equipment (UE) comprising:
   transceiver circuitry configured to:
      receive triggering information that includes an Application Port ID; and
   processor circuitry in the UE to:
      route a trigger message to a triggering function using the Application Port ID, wherein the trigger message further includes a standardized identifier, and wherein the circuitry is further arranged to distinguish messages carrying device triggering information based on the standardized identifier identify an Application Port ID based on a message, wherein a payload of the trigger message includes a priority value to indicate the priority of the trigger message and, when the priority of the trigger message is low, the UE is to receive the trigger message when the UE is in a connected state and not receive the trigger message when the UE is in an idle state.

2. The UE of claim 1, wherein the UE is configured to perform machine-type communications (MTC).

3. The UE of claim 1, further including:
   two or more antennas.

4. The UE of claim 1, further including:
   file storage memory.

5. A Machine Type Communication Interworking Function (MTC-IWF) comprising:
processing circuitry to
receive a device trigger request, from a Services Capability Server (SCS), that includes an Application Port ID, wherein a trigger payload corresponding to the device trigger request includes a priority value to indicate priority of the trigger request; and
forward a standardized identifier to the UE to allow the UE to distinguish machine-type messages carrying device triggering information, wherein the MTC-IWF is further arranged to,
when the priority of the device trigger request is low,
send the device trigger message when the UE is in a connected state; and
buffer the device trigger message when the UE is in an idle state.

6. A non-transitory computer-readable medium including instructions that, when executed on a machine, cause the machine to:
receive a message including a device trigger request that includes an Application Port wherein a trigger payload corresponding to the device trigger request includes a priority value to indicate priority of the trigger request; and
forward a standardized identifier to the UE to allow the UE to distinguish machine-type messages carrying device triggering information, wherein the instructions further cause the machine to, when the priority of the device trigger request is low,
send the device trigger message when the UE is in a connected state; and
buffer the device trigger message when the UE is in an idle state.

7. The non-transitory computer-readable medium of claim 6, wherein the machine includes a Machine Type Communications Interworking Function (MTC-IWF), and wherein the request is received from a Services Capability Server (SCS).

8. The non-transitory computer-readable medium of claim 6 wherein the machine is a mobile management entity (MME).

9. A non-transitory computer-readable medium including instructions that, when executed on a user equipment (UE), cause the UE to:
identify an Application Port ID; and
route a trigger to a triggering function, within the UE, indicated by the Application Port ID, wherein a payload of the trigger includes a priority value to indicate the priority of the trigger and, when the priority of the trigger is low, the UE is to receive the trigger when the UE is in a connected state and not receive the trigger when the UE is in an idle state.

10. The non-transitory computer-readable medium of claim 9, wherein triggering information is received via IP-SM-GW.

11. The non-transitory computer-readable medium of claim 9, wherein triggering information further includes a standardized identifier, and wherein the instructions further cause the UE to distinguish messages carrying device triggering information based on the standardized identifier.

12. An apparatus comprising:
circuitry configured to identify an Application Port ID based on a message from a 3rd Generation Partnership Project (3GPP) network; and
route a trigger to a triggering function using the Application Port ID, wherein the message further includes a standardized identifier, and wherein the circuitry is further arranged to distinguish messages carrying device triggering information based on the standardized identifier, wherein a payload of the trigger includes a priority value to indicate the priority of the trigger and, when the priority of the trigger is low, the UE is to receive the trigger when the UE is in a connected state and not receive the trigger when the UE is in an idle state.

13. The apparatus of claim 12, wherein triggering information is received via IP Short Message Gateway (IP-SM-GW).

14. The apparatus of claim 12, wherein the circuitry is included in a device is configured to perform machine-type communications (MTC).

* * * * *